United States Patent [19]

vor der Bruck et al.

[11] 4,084,838
[45] Apr. 18, 1978

[54] MOTOR VEHICLE REAR AXLE SUSPENSION

[75] Inventors: Rolf vor der Bruck, Cologne-Porz; Walter Voll, Odenthal-Voiswinkel, both of Germany

[73] Assignee: Ford Motor Company, Dearborn, Mich.

[21] Appl. No.: 689,439

[22] Filed: May 24, 1976

[51] Int. Cl.² ........................................ B60G 11/18
[52] U.S. Cl. .............................. 280/715; 267/11 R; 280/719
[58] Field of Search ............ 280/697, 715, 723, 725; 267/20 R, 57, 66, 11 R; 180/73 R, 85, 71

[56] References Cited

U.S. PATENT DOCUMENTS

| 2,666,280 | 12/1941 | Sherman | 267/20 R |
| 3,469,649 | 9/1969 | Hoyt | 267/11 R |
| 3,601,425 | 8/1971 | Sampietro | 267/11 R |

*Primary Examiner*—Philip Goodman
*Attorney, Agent, or Firm*—Clifford L. Sadler; Keith L. Zerschling

[57] ABSTRACT

According to this disclosure, a suspension system for a motor vehicle having a pair of rear wheel rotatably supported by a solid rear axle comprises upper and lower pairs of suspension arms pivotally connected to the vehicle frame and the axle. In the preferred embodiment, a leaf spring extends in a generally transverse direction and has its ends rigidly secured to two of the suspension arms. The leaf spring provides lateral stability to the vehicle suspension and resiliently resists angular displacement of the vehicle body about a longitudinal roll axis.

11 Claims, 2 Drawing Figures

MOTOR VEHICLE REAR AXLE SUSPENSION

BACKGROUND AND SUMMARY OF THE DISCLOSURE

The present disclosure relates generally to a motor vehicle rear axle suspension of the linkage type in which a pair of suspension arms interconnect the vehicle frame and the rear axle. In accordance with the disclosure an additional suspension element is provided that serves the dual function of providing lateral stability to the suspension and of resiliently resisting body roll about a longitudinal roll axis.

The following United States patents were noted prior to the filing of the application upon which this patent issued: U.S. Pat. Nos. 2,266,280; 3,171,642; 3,193,042; 3,202,236; 3,444,947; 3,575,441; 3,693,746 and 3,887,025.

In the presently preferred embodiment of the invention, a pair of lower generally parallel suspension arms interconnect the vehicle frame and the rear axle. A pair of generally parallel upper suspension arms also interconnect the frame and axle. Coil springs are interposed between the lower pair of suspension arms and the vehicle frame for the purpose of resiliently supporting a portion of the mass of the frame upon the road wheels. An elongated leaf spring member extends generally transversely and has its ends rigidly connected to the upper suspension arms at a location near the point where those arms are pivotally joined to the vehicle frame.

The leaf spring interconnecting the two upper arms provides the suspension system with lateral stability. In addition, it functions as an anti-roll stabilizer by resiliently resisting angular deflection of one upper arm with respect to the other upper arm in the side elevational view.

The suspension system according to the present invention is characterized by its simplicity of construction and its superior performance in a motor vehicle.

BRIEF DESCRIPTION OF THE DRAWINGS

The many objects and advantages of a motor vehicle suspension system construction in accordance with this invention will become apparent upon consideration of the following detailed discussion and the accompanying drawings, in which.

DETAILED DESCRIPTION OF THE PREFERRED EMBODIMENT

Figure 1:
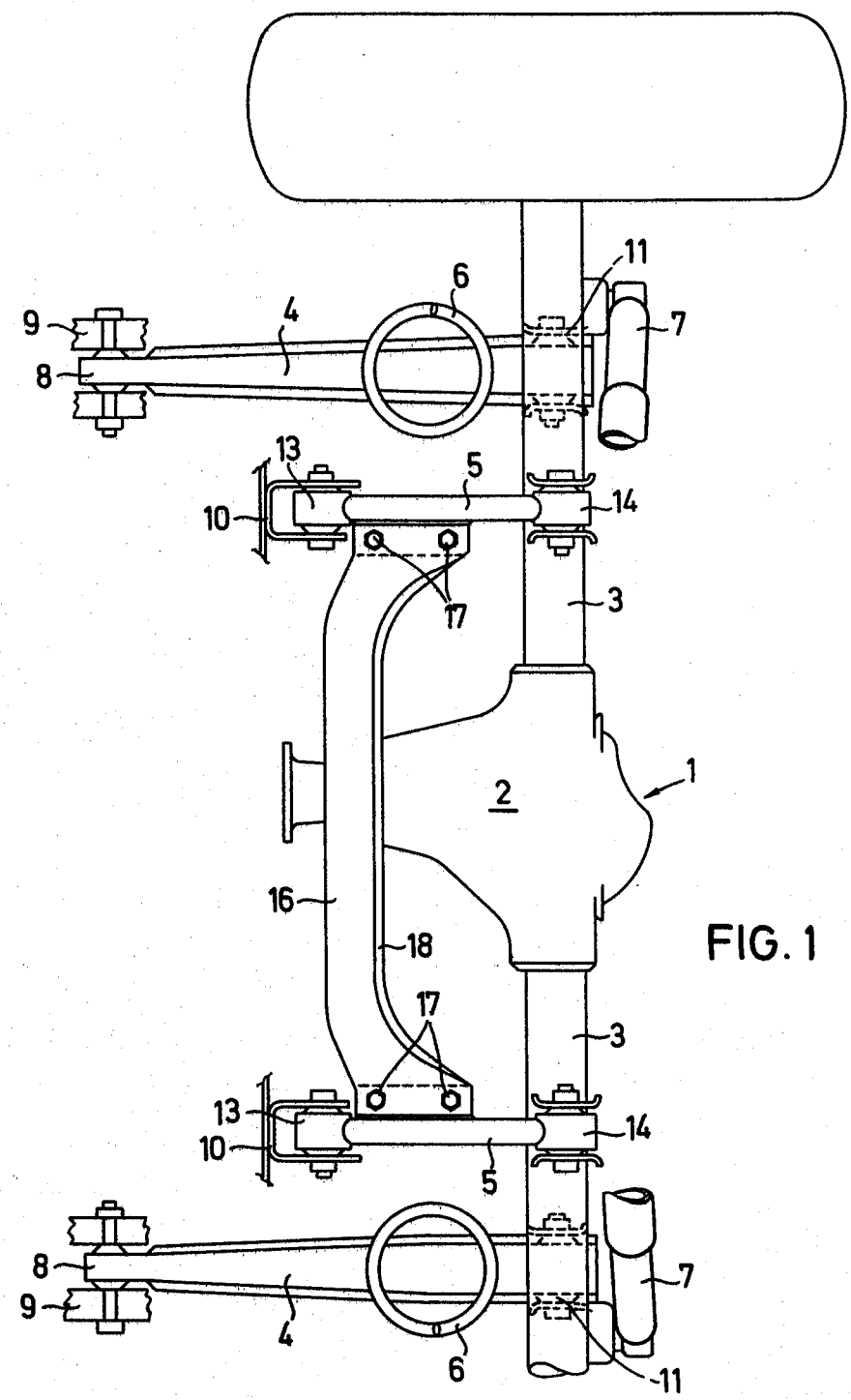
FIG. 1 is a top plan view of a rear axle suspension system for a motor vehicle in accordance with the presently preferred embodiment of the invention.
Figure 2:
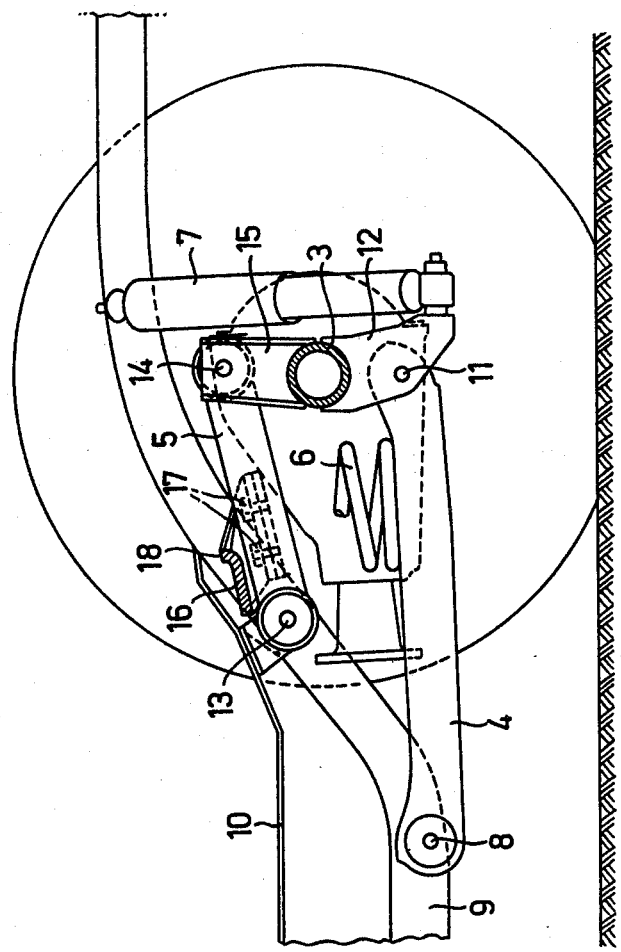
FIG. 2 is a side elevational view of the suspension shown in FIG. 1.

Referring now to the drawings wherein the presently preferred embodiment of this invention is disclosed, FIG. 1 shows a top plan view of a rear axle suspension for a motor vehicle. In that view, a rigid rear axle 1 comprises a differential gear housing 2 and a pair of axle tubes 3 rigidly connected to the differential gear housing 2. The axle tubes 3 contain half shafts which have their outer ends connected to left and right road wheels. The rigid axle housing 1 is guided by a pair of lower longitudinally extending suspension arms 4 and a pair of upper longitudinally extending suspension arms 5. Coil springs 6 are interposed between the lower suspension arms 4 and the vehicle frame or body. Springs 6 constitute the main rear suspension springs of the vehicle. Jounce and rebound movement is damped by shock absorbers 7 which are connected to the axle housing 1 and the vehicle frame or body.

The lower suspension arms 4 are pivotally attached at their forward ends 8 to longitudinal frame members 9 that are formed integrally with the floor 10 of the vehicle body. The rearward ends of the lower arms 4 are pivotally connected at 11 to depending brackets 12 that are secured to the axle tubes 3 near their outer ends.

The two upper suspension arms 5 have their forward ends 13 pivotally connected to brackets that are welded to the floor 10 of the vehicle body. The rearward ends 14 of the upper arms 5 are pivotally connected to upwardly projecting brackets 15 welded to the axle tubes 3 of the rigid axle housing 1.

In accordance with the preferred embodiment of the invention, the upper suspension arms 5 are arranged generally parallel. They are connected together adjacent their forward ends 13 by means of a coupling element 16. The pivot constructions at the forward and rearward ends 13 and 14 of the suspension arms 5 are constructed so that they can transmit side forces. The coupling element 16 is constructed as a leaf spring having a substantially rectangular cross-section with broadened ends that are attached by machine screws or bolts 17 to flanges that are formed on the upper suspension arms 5. The leaf spring coupling element 16 is provided with a bent rearward edge 18 to assure that any side forces which are imposed upon the coupling element 16 by one of the arms 5 will be transmitted horizontally in a rigid manner to the other arm 5. The coupling element 16 is torsionally resilient and rigid in compression.

The coupling element 16 rigidly connecting the two upper suspension arms 5 together may be constructed in other ways in other embodiments of the invention. Other cross-sectional shapes for the coupling element 16 may be suitable if they have rigidity with respect to horizontal deflection and resiliency with respect to torsional deflection. It is also conceivable that the upper suspension arms and connecting element may be formed as an integral structure of single skin or double skin sheet metal stamping.

In summary, the suspension construction comprising the upper arms 5 and coupling element 16 provides lateral stability to the suspension system. The combination controls and prevents excess lateral movement of the vehicle body with respect to the axle housing 1 and the road wheels. In addition, the coupling element 16 in combination with upper suspension arms 5 resiliently resists roll of the vehicle body about a longitudinal roll axis.

The foregoing description presents the presently preferred embodiment of this invention. Modifications and alterations may occur to those skilled in the art that will come within the scope and spirit of the following claims.

We claim:

1. A motor vehicle suspension including a wheel support member constructed to rotatably support a road wheel, a vehicle frame and suspension means interconnecting said wheel support member and said frame;
   said suspension means comprising a pair of suspension arms pivotally connected to said frame and to said wheel support member;
   a coupling element extending between said pair of suspension arms and having its ends non-rotatably secured to said arms;

said coupling element being spaced apart from said frame and from said wheel support member;

said coupling element being rigid with respect to deflection in a horizontal plane;

said coupling element being constructed to resiliently resist torsional deflection.

2. A motor vehicle suspension system according to claim 1 and including:

said suspension arms being arranged generally parallel and extending in a generally longitudinal direction.

3. A motor vehicle suspension system according to claim 1 and including:

said suspension arms being arranged generally parallel and extending in a generally longitudinal direction;

said coupling element extending generally transversely.

4. A motor vehicle suspension system according to claim 1 and including:

said suspension arms being arranged generally parallel and extending in a generally longitudinal direction;

said coupling element extending generally transversely;

said coupling element being secured to said arms intermediate their ends and adjacent the location where said arms are connected to said frame.

5. A motor vehicle suspension system including a rigid axle, a pair or road wheels rotatably supported at the outer ends of said axle, a vehicle frame and suspension means interconnecting said axle and said frame;

said suspension means comprising left and right parallel longitudinally extending suspension arms;

first resilient pivot means connecting said arms to said frame;

second resilient pivot means connecting said arms to said axle;

a generally transversely extending leaf spring having its ends secured to said left and right suspension arms;

said leaf spring being spaced apart from said frame and from said axle.

6. A motor vehicle suspension system according to claim 5 and including:

said leaf spring being rigidly connected to said left and right suspension arms adjacent said first resilient pivot means and intermediate the ends of said arms.

7. A motor vehicle suspension system according to claim 5 and including:

said leaf spring being constructed to rigidly resist horizontally deflection of said left arm with respect to said right arm;

said leaf spring being constructed to resiliently resist angular deflection, in the side elevational view, of said left arm relative to said right arm.

8. A motor vehicle suspension system including a rigid axle, left and right road wheels rotatably supported at the outer ends of said axle, a vehicle frame and suspension means interconnecting said axle and said frame;

coil spring means constructed to resiliently support said frame on said road wheels;

said suspension means comprising a first pair of generally longitudinally extending suspension arms pivotally connected to said frame and to said axle;

left and right generally longitudinally extending second pair of suspension arms;

first resilient pivot means and second resilient pivot means pivotally connecting said left and right second suspension arms to said frame and to said axle, respectively;

an elongated torsionally resilient member having left and right ends non-rotatably secured to said left and right second suspension arms, respectively;

said resilient member being spaced apart from said frame and from said axle.

9. A motor vehicle suspension system according to claim 8 and including:

said resilient member comprising a transversely extending leaf spring.

10. A motor vehicle suspension system according to claim 8 and including:

said resilient member comprising a transversely extending leaf spring;

said leaf spring being rigidly secured to said left and right second suspension arms adjacent said first resilient pivot means.

11. A motor vehicle suspension system including a rigid axle, left and right road wheels rotatably supported at the outer ends of said axle, a vehicle frame and suspension means interconnecting said axle and said frame;

coil spring means constructed to resiliently support said frame on said road wheels;

said suspension means comprising a first pair of generally longitudinally extending suspension arms pivotally connected to said frame and to said axle;

left and right generally longitudinally extending second pair of suspension arms;

first resilient pivot means and second resilient pivot means pivotally connecting said left and right second suspension arms to said frame and to said axle, respectively;

an elongated torsionally resilient leaf spring having left and right ends non-rotatably secured to said left and right second suspension arms, respectively;

said leaf spring extending in a generally transverse direction and being spaced apart from said axle and from said frame;

said leaf spring being rigidly secured to said left and right second suspension arms generally adjacent to said first resilient pivot means;

the body portion of said leaf spring being generally flat and residing in a nearly horizontal plane.

* * * * *